UNITED STATES PATENT OFFICE.

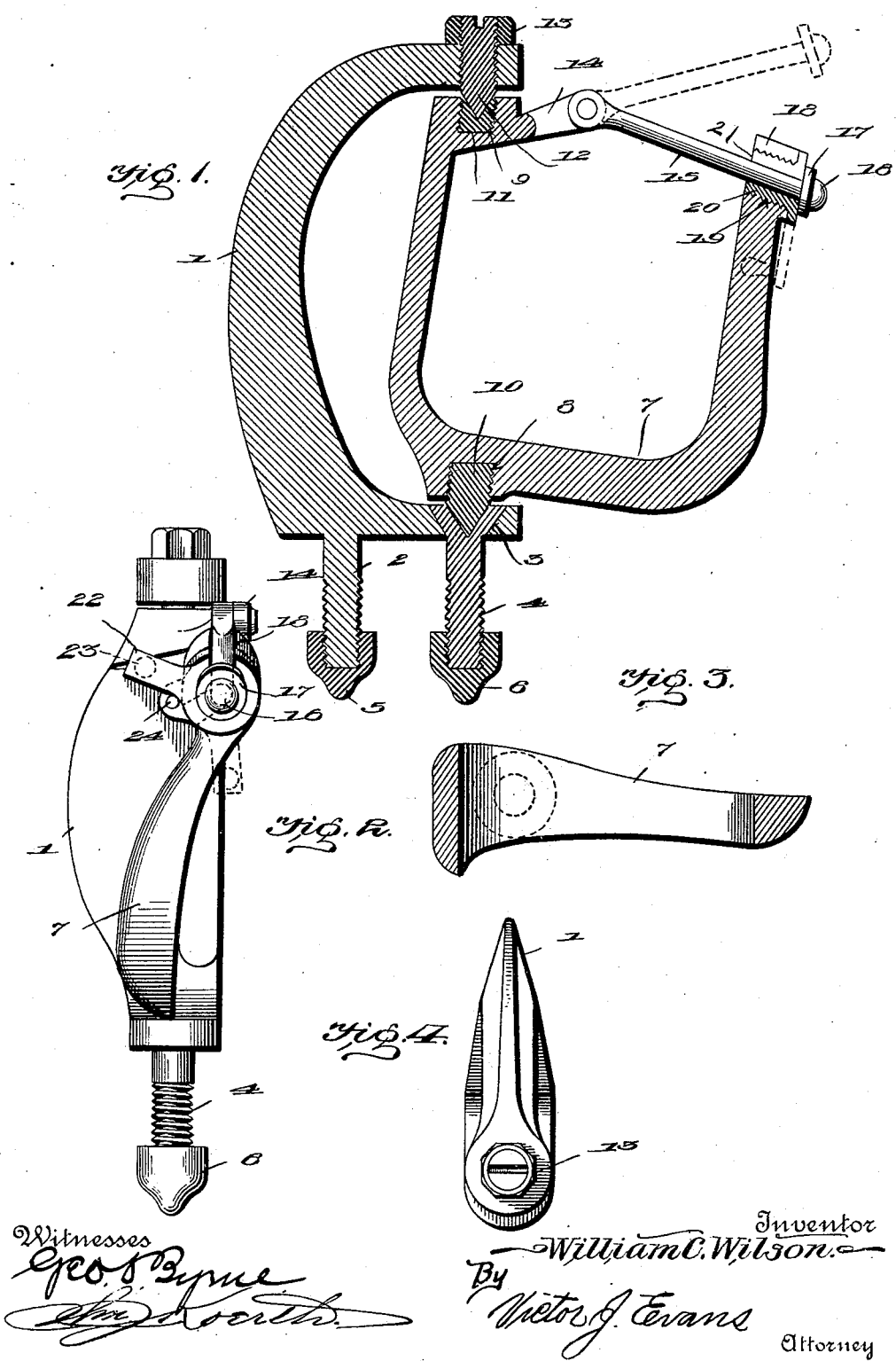

WILLIAM C. WILSON, OF PHILADELPHIA, PENNSYLVANIA.

OAR-LOCK.

SPECIFICATION forming part of Letters Patent No. 683,540, dated October 1, 1901.

Application filed January 12, 1901. Serial No. 43,049. (No model.)

*To all whom it may concern:*

Be it known that I, WILLIAM C. WILSON, a citizen of the United States, residing at Philadelphia, in the county of Philadelphia and State of Pennsylvania, have invented new and useful Improvements in Oar-Locks, of which the following is a specification.

My invention relates to oar-locks, the object being to provide a device of this character which will turn freely in its bearings and securely hold an oar against accidental displacement.

The construction of the improvement will be fully described hereinafter in connection with the accompanying drawings, which form a part of this specification, and its novel feature will be defined in the appended claims.

In the drawings, Figure 1 is a vertical section of an oar-lock and its supporting-bracket embodying the invention. Fig. 2 is an elevation of the same. Fig. 3 is a transverse section of the oar-lock, and Fig. 4 is a plan view of the supporting-bracket.

The reference-numeral 1 designates a bracket of curved form provided at its lower end with a depending threaded stud 2 and an opening 3 to receive a bolt 4. The stud 2 and bolt 4 are adapted to project through the outrigger of a row-boat and be secured by nuts 5 and 6.

7 designates the oar-lock, which is of U shape and formed at the upper and lower ends of one side with threaded sockets 8 and 9. Within the lower socket 8 is secured a journal-pin 10, threaded to fit the socket and having a conical lower end to fit the countersink in the head of the bolt 4. Within the socket 9 is secured a screw 11, formed with a conical seat in its upper end to receive the conical point of a screw 12, which passes through a threaded opening in the upper end of the bracket 1 and is secured by a nut 13.

From the inner arm of the oar-lock projects an arm 14, to which is pivotally secured a rod 15, formed at its outer end with a head 16 and a flange 17. The outer arm of the oar-lock is formed at its upper end with a slot 18, communicating with a circular threaded opening 19, within which fits a sleeve 20, provided with a longitudinal slot 21, adapted to register with the slot 18 in the upper end of the outer arm of the oar-lock to permit the rod 15 to enter the sleeve. After the rod is in position within the sleeve 20 the latter is adapted to be turned a part revolution by means of an arm 22, depending from the outer end of the sleeve 20 and provided with a handle 23. The arm 22 is adapted to contact with a stop-lug 24, projecting from the outer arm of the oar-lock to limit the movement of the sleeve.

It will be apparent that the rod 15 may be readily disengaged from the outer arm of the oar-lock to permit of the removal or insertion of an oar and that the oar will be securely retained within the oar-lock when the rod 15 is in place within the sleeve 20.

The conical bearings of the oar-lock permit the latter to turn freely with the movement of the oar.

I claim—

1. The combination with a bracket formed with openings; an oar-lock pivotally secured between the arms of the bracket; a rod pivotally secured at one end to one side of the oar-lock; and means for detachably securing the other end of the rod comprising a rotary sleeve formed with a slot adapted to register with a slot formed in the oar-lock.

2. The combination with a bracket and means for securing the same to a row-boat; of an oar-lock comprising a U-shaped yoke; conical bearings for pivotally securing the yoke to the bracket; a rod pivotally secured to one side of the yoke; a sleeve rotatably mounted in the other side of the yoke and formed with a longitudinal slot adapted to register with a slot in the yoke; and an arm projecting from said sleeve and provided with a handle.

3. The combination with a bracket, the arms of which are formed with openings; of an oar-lock and means for pivotally securing the same to the bracket-arms comprising a bolt fitting one of the openings in the bracket, and having a conical countersink; a screw projecting from the oar-lock and fitting said opening, and a conical screw extending through the other opening in the bracket and fitting a conical bearing in the adjacent side of the oar-lock.

4. The combination with a bracket formed with a threaded stud and an opening adjacent thereto; of a bolt extending through said opening and formed with a conical countersink;

an oar-lock comprising a U-shaped yoke; a conical screw fitting said countersink; a conical bearing at the upper end of the yoke; an arm projecting from the inner side of the yoke; a rod pivotally secured to said arm; a threaded sleeve rotatably mounted in the upper end of the outer side of the yoke and formed with a longitudinal slot adapted to register with a slot in the yoke; and an arm projecting from the sleeve and having a handle for moving the sleeve.

In testimony whereof I affix my signature in presence of two witnesses.

WILLIAM C. WILSON.

Witnesses:
 JOHN MCALLISTER,
 CHAS. A. MCNAMEE.